(No Model.)
D. GROVE.
APPARATUS FOR STERILIZING WATER.
No. 500,763. Patented July 4, 1893.
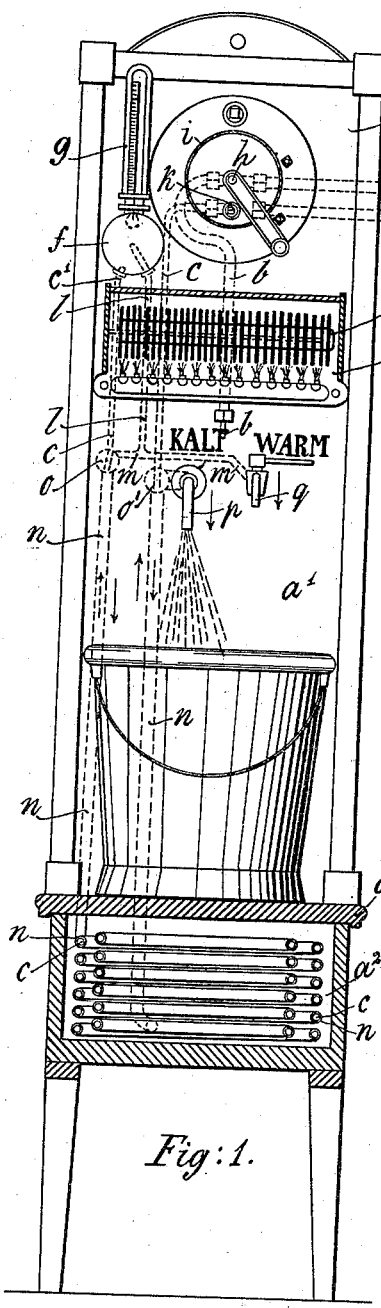
Fig: 1.
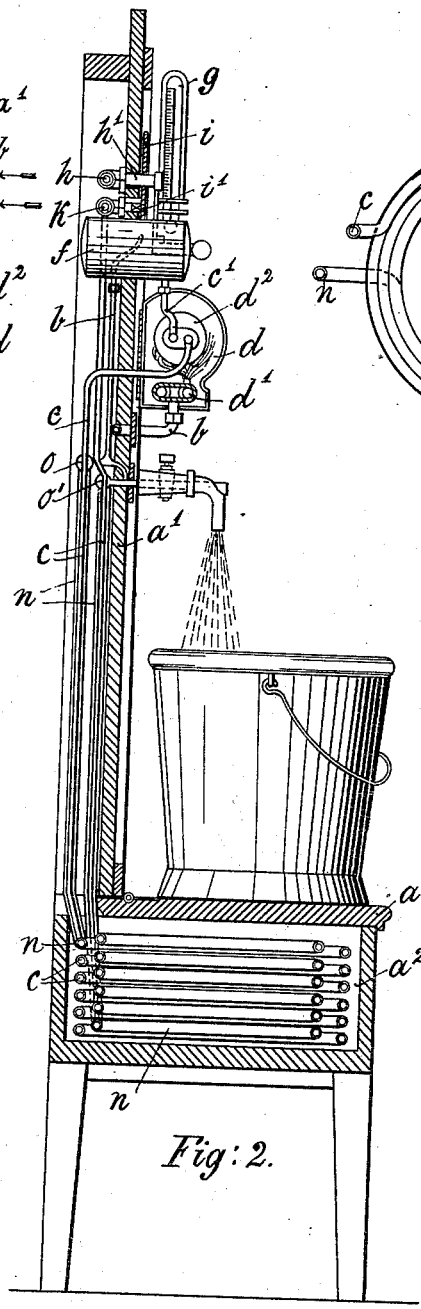
Fig: 2.
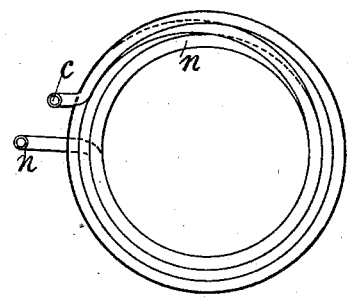
Fig: 3.
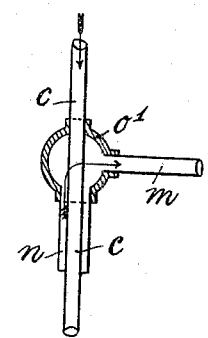
Fig: 4.
Witnesses:
E. B. Bolton
E. K. Sturtevant
Inventor:
David Grove
By 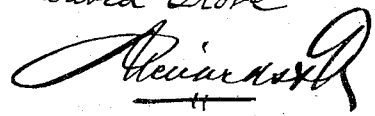
his Attorneys.

UNITED STATES PATENT OFFICE.

DAVID GROVE, OF BERLIN, GERMANY.

APPARATUS FOR STERILIZING WATER.

SPECIFICATION forming part of Letters Patent No. 500,763, dated July 4, 1893.

Application filed February 28, 1893. Serial No. 464,099. (No model.) Patented in England November 14, 1892, No. 20,568.

*To all whom it may concern:*

Be it known that I, DAVID GROVE, a subject of the Emperor of Germany, and a resident of 24 Friedrich Strasse, Berlin, in the Empire of Germany, have invented a certain new and useful Improved Apparatus for Sterilizing Water, of which the following is a specification, said device having been patented in England November 14, 1892, No. 20,568.

The present invention relates to an improved apparatus for sterilizing water, in which water is made to boil in order to become sterilized in the least possible space of time by a heating device and then quickly cooled again by cold water in such way that it can be drawn off from the apparatus as drinkable water. This object is attained by the cold water inlet pipe being encircled for the greater part of its length by a second pipe, which, after the water has passed into the heating device and has therein been heated, leads the water into a storage reservoir, and conducts same back again the same way, but in the opposite direction, in order to bring it in contact with the pipe leading the cold water. By this arrangement, the heated and sterilized water communicates its heat to the water passing upward into the heating device, and at the same time is thus gradually cooled on its way, being ultimately quite cold and drinkable when drawn off.

This sterilizing apparatus is very suitable for household use, since it is so arranged that, in addition to sterilized cold water, it can also deliver boiling water in any quantities required. There is an arrangement whereby a cock in the water inlet pipe can only be opened after the gas tap has been opened, this being effected by a disk mounted on the spindle of the gas valve or tap, and which disk turns with said spindle, uncovering at the end of its movement by a suitable opening or recess, the water-valve which was hitherto covered by such disk.

Referring to the accompanying drawings which form a part of this specification: Figure 1 is a sectional front view of the water sterilizing apparatus. Fig. 2 is a vertical section. Fig. 3 is a plan view of the water tubes bent in spiral form and pushed into each other. Fig. 4 is a sectional view of the connection of the end of an outer with an inner pipe.

The sterilizing apparatus is shown as having the form of a kitchen or box-chair $a$ with a high back $a'$, but the invention is, of course, not restricted to this form alone. Behind the back $a'$ and at the upper end of the same, are fixed the gas pipe $b$ and the water pipe $c$ (Fig. 1). The gas pipe $b$ leads direct to the burner $d'$ of the heating device, while the water pipe $c$ extends downward to the bottom of the space inside the box chair $a$, and from here goes upward spirally, being ultimately connected with the body $d^2$ of the heating device $d$, which in its turn is connected with a reservoir $f$ by a pipe $c'$. A thermometer $g$ is arranged on the reservoir $f$. When sterilized and cooled, that is, drinkable water is required, the gas cock $h$ on the spindle $h'$ on which a disk $i$ turning with said spindle and provided with an opening $i'$ is mounted, must be opened. When the gas cock $h$ is open, the opening $i'$ (as shown in Figs. 1 and 2) stands directly over the square of the water cock $h$ so that, in this position, the latter can also be opened by means of a special key. The water entering by the inlet pipe $c$ is conducted through said pipe $c$ after having passed through a coil in the inside space $a^2$ of the chair-box $a$, to the heating body $d^2$ of the heating device $d$, and there quickly heated to boiling point by the flame from the burner $d'$. From there the water passes into the reservoir $f$ where it is collected; it then flows on through the pipe $l$ into the pipe $m$ entering afterward through the joint $o$ into the pipe $n$ which encircles the inlet pipe $c$. The hot water is thus returned in the annular space between the tubes $n$ and $c$ in the opposite direction to the fresh cold water as shown by the arrows in Fig. 1, and can be drawn off by the cock $p$ quite cold after having passed a second joint $o'$. By this arrangement, the hot sterilized water is quickly and thoroughly cooled, and at the same time the cold water becomes pre-heated. In order to better cool the warm water to a drinkable temperature, that is, to keep the same as long as possible in contact with the cold water, the two pipes $c$, $n$ the one of which is inserted into the other, and the whole bent as mentioned in a coil in the space $a^2$ of the chair $a$, can, when required, be still more rapidly cooled by placing ice in such space.

The water sterilizing apparatus is further so arranged, that boiling water can be drawn off direct from same. To this end the pipe m besides being in connection with the pipe n, is in direct connection with a cock or tap q by which warm water can be drawn out of the reservoir without its having to pass through the pipe n.

By means of the thermometer g on the storage reservoir f, one is always able to ascertain and control the degree of temperature of warm water entering from the heating device d and to see that it is of the right sterilizing temperature. The reservoir f has the further purpose of equalizing unequal pressure in the pipes.

By arranging the disk i over the gas and water cocks as described, the water cock can only be opened after the gas cock has been opened and, by this arrangement, the water still remaining in the heating device from the last employment of the sterilizing apparatus can be boiled again, since the short time of turning the lever is sufficient for this purpose.

When the apparatus is put out of function, the water-cock must first be closed.

Having now described my invention, what I claim as new, and desire to secure by Letters Patent, is—

1. In combination, the gas heater d, the pipe c leading thereto, the reservoir f connected with the gas heater for receiving the hot water, the pipe l, leading from the reservoir and having a branch m, the hot water discharge pipe n connected with the branch m and surrounding the cold water pipe, the spigot p on he pipe n for the discharge of the cold water and the spigot q on the branch pipe m for the discharge of the hot water, substantially as described.

2. In combination, the gas heater, the gas supply pipe leading thereto, the cock in said pipe, the water supply pipe extending adjacent to the gas supply pipe and having a cock near the gas cock, the hot and cold water circulating pipes, the disk on the stem of the gas cock and arranged over the stem of the water cock, said disk having a perforation adapted to align with the water cock stem when the gas cock is opened full way and the support for the parts, substantially as described.

3. In combination, with the chair having the upright back and hollow bottom, the gas heating device and reservoir f on the back, the gas and water supply pipes leading to the heating device, the pipe leading from the heating device to the reservoir, the hot and cold water circulating pipes extending down into the chair bottom and coiled therein, said pipes including the branch pipe m, the spigot q on said pipe for drawing off the hot water and the spigot p for the cold water pipe both of said spigots being arranged on the back above the chair bottom, substantially as described.

In witness whereof I have hereunto signed my name in the presence of two subscribing witnesses.

DAVID GROVE.

Witnesses:
ARTHUR BAERMANN,
ALFRED MEISTERY.